US012785948B2

(12) United States Patent
Patel et al.

(10) Patent No.: US 12,785,948 B2
(45) Date of Patent: Nov. 3, 2026

(54) SYSTEM AND METHOD TO PERFORM DYNAMIC QUANTUM-BASED DISTRIBUTION AND ENCRYPTION OF KEYS IN A NETWORK

(71) Applicant: Bank of America Corporation, Charlotte, NC (US)

(72) Inventors: Premal Mahendra Patel, Mumbai (IN); Avinash Basavant Nigudkar, Mumbai (IN); Chhavi Taneja, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 19/181,107

(22) Filed: Apr. 16, 2025

(65) Prior Publication Data

US 2026/0332399 A1 Oct. 22, 2026

(51) Int. Cl.
*H04L 9/08* (2006.01)

(52) U.S. Cl.
CPC .......... *H04L 9/0852* (2013.01); *H04L 9/0869* (2013.01); *H04L 9/088* (2013.01); *H04L 9/0894* (2013.01)

(58) Field of Classification Search
CPC ... H04L 9/0852; H04L 9/0869; H04L 9/0894; H04L 9/088
See application file for complete search history.

(56) References Cited

U.S. PATENT DOCUMENTS

| | | | | |
|---|---|---|---|---|
| 8,897,449 | B1 * | 11/2014 | Broadbent | H04L 9/0891 380/278 |
| 9,654,287 | B2 | 5/2017 | Zhao et al. | |
| 9,692,595 | B2 | 6/2017 | Lowans et al. | |
| 10,103,880 | B2 | 10/2018 | Fu | |
| 10,348,493 | B2 | 7/2019 | Fu et al. | |
| 10,432,395 | B2 | 10/2019 | Howe et al. | |
| 10,439,806 | B2 | 10/2019 | Fu et al. | |
| 10,757,083 | B2 | 8/2020 | Fu et al. | |
| 10,814,893 | B2 | 10/2020 | Mong et al. | |

(Continued)

FOREIGN PATENT DOCUMENTS

| | | | |
|---|---|---|---|
| JP | 6715976 | B2 | 7/2020 |
| JP | 6771565 | B2 | 10/2020 |

OTHER PUBLICATIONS

P. Rani, A. K. Singh, A. Parashar and D. Saxena, "Quantum-Secure Data Transmission in Smart Grid," 2024 IEEE 17th International Symposium on Embedded Multicore/Many-core Systems-on-Chip (MCSoC), Kuala Lumpur, Malaysia, 2024, pp. 475-481. (Year: 2024).*

(Continued)

*Primary Examiner* — Kari L Schmidt

(57) ABSTRACT

A system comprises at least two devices equipped with one or more quantum processors. The system may be configured to coordinate operations between the one or more quantum processors to establish, control, and/or monitor encryption keys in a network. The encryption keys are concealed through multiple encryption layers as the encryption keys are shared between one or more nodes, devices, and/or network components. The system is configured to develop one or more protocols that may be used to maintain and/or control security of shared encryption keys in the network.

20 Claims, 2 Drawing Sheets

(56) References Cited

U.S. PATENT DOCUMENTS

| | | | |
|---|---|---|---|
| 10,880,294 B2 | 12/2020 | Choyi et al. | |
| 10,891,555 B2 | 1/2021 | Ashrafi | |
| 10,999,068 B2 | 5/2021 | Fu | |
| 11,070,369 B2 | 7/2021 | Howe et al. | |
| 11,164,104 B2 | 11/2021 | Ashrafi | |
| 11,170,318 B2 | 11/2021 | Ashrafi | |
| 11,620,471 B2 | 4/2023 | Brock | |
| 11,675,880 B2 | 6/2023 | Gidley et al. | |
| 11,727,310 B1 | 8/2023 | Arbajian et al. | |
| 11,985,235 B2 * | 5/2024 | Obadia | H04L 9/0855 |
| 11,991,275 B2 | 5/2024 | Newton et al. | |
| 12,231,552 B1 * | 2/2025 | Aguero Trejo | H04L 9/0852 |
| 2011/0317836 A1 * | 12/2011 | Yeh | H04L 9/0855 380/255 |
| 2013/0101121 A1 * | 4/2013 | Nordholt | H04L 9/0852 380/279 |
| 2017/0324552 A1 * | 11/2017 | Ahn | H04L 9/0855 |
| 2017/0338952 A1 * | 11/2017 | Hong | H04L 9/083 |
| 2020/0044750 A1 * | 2/2020 | Cai | H04B 10/70 |
| 2020/0403787 A1 * | 12/2020 | Islam | H04L 9/0852 |
| 2022/0116208 A1 * | 4/2022 | Stapleton | H04L 9/0631 |
| 2022/0198458 A1 | 6/2022 | Narendranathan et al. | |
| 2022/0247558 A1 * | 8/2022 | Kronberg | H04L 9/0852 |
| 2023/0027422 A1 * | 1/2023 | Hines, III | H04L 9/0852 |
| 2023/0132571 A1 * | 5/2023 | Bakopoulos | H04L 63/0435 726/34 |
| 2023/0188335 A1 | 6/2023 | Lamas Linares et al. | |
| 2024/0097890 A1 * | 3/2024 | Goh | H04L 9/0869 |
| 2024/0204998 A1 * | 6/2024 | Yeomans | H04L 9/0858 |
| 2024/0204999 A1 * | 6/2024 | Tong | G06F 21/64 |
| 2025/0015980 A1 * | 1/2025 | Stapleton | B64U 10/13 |
| 2025/0023720 A1 * | 1/2025 | Lim | H04L 9/0852 |
| 2025/0094129 A1 * | 3/2025 | Zbinden | G06N 10/40 |
| 2025/0337576 A1 * | 10/2025 | Joshi | H04L 9/0869 |
| 2026/0058805 A1 * | 2/2026 | Rosas-Bustos | H04L 9/0858 |

OTHER PUBLICATIONS

Durr-E-Shahwar, M. Imran, A. B. Altamimi, W. Khan, S. Hussain and M. Alsaffar, “Quantum Cryptography for Future Networks Security: A Systematic Review,” in IEEE Access, vol. 12, pp. 180048-180078, 2024. (Year: 2024).*

Garcia Cid, Marta Irene, et al. “Disruptive quantum safe technologies.” Proceedings of the 17th International Conference on Availability, Reliability and Security. 2022, pp. 1-8. (Year: 2022).*

M. Rajpurohit, K. M. Deka, V. P. Singh and H. P, “Advanced QKD Protocols and Practical Challenges,” 2024 IEEE International Conference on Public Key Infrastructure and its Applications (PKIA), Bangalore, India, 2024, pp. 1-8. (Year: 2024).*

* cited by examiner

SYSTEM AND METHOD TO PERFORM DYNAMIC QUANTUM-BASED DISTRIBUTION AND ENCRYPTION OF KEYS IN A NETWORK

TECHNICAL FIELD

The present disclosure relates generally to operations associated with quantum encryption, and more specifically to a system and method to perform dynamic quantum-based distribution and encryption of keys in a network.

BACKGROUND

In communication systems, cyberattacks are more prevalent as cybersecurity becomes more dependent and influenced by emerging and disruptive technologies. Databases that store valuable, confidential, and sensitive information may be targets for cyberattacks. Recent data breaches have underscored growing sophistications of bad actors and complexities associated with managing databases in an increasingly connected world. In particular, bad actors may devise new ways to infiltrate entire databases and data eco-systems.

SUMMARY OF THE DISCLOSURE

In one or more embodiments, a system and method described herein are configured to perform dynamic quantum-based distribution and encryption of keys in a network. In particular, the system may be configured to generate a secure quantum encryption key that may be used to encrypt multiple objects in a network. In some embodiments, the system comprises a quantum cryptography-based framework configured to perform auto-cryptography at the web application and infrastructure level, while ciphering critical information in web configuration files using quantum encryption. The system is configured to integrate quantum key distribution (QKD) principles with secure enclave protocols and Secure Multi-Party Computation (SMPC) protocols to ensure secure generation, distribution, and management of cryptographic keys. Then, the quantum-generated keys may be used to automatically encrypt and decrypt sensitive data within a web application configuration files and other critical components of an infrastructure.

In one or more embodiments, the systems described herein are integrated into a practical application of providing security layers before accessing encryption keys in a communication network. In particular, the systems may be configured to provide additional security protections to encryption keys in the communication network after keys are generated and/or after encryption keys are exchanged between the server 102 and/or one or more of the workspace devices 106. The encryption keys are managed and/or distributed using dedicated encrypted quantum channels that are secured using one or more quantum protocols. Herein, the systems are configured to dynamically separate bad actors (e.g., electronic attacker attempting to illegitimate access the communication network) from legitimate workspace devices attempting to reach encryption keys in the communication network by providing classical layers and quantum layers of encryption.

In one or more embodiments, the systems are directed to improvements in computer systems. Specifically, the systems reduce processor and memory usage in servers and/or workspace devices by quickly identifying bad actors from legitimate users attempting to access encryption keys in a communication network. As entities are determined to be bad actors based on their actions in the communication network, the systems are configured to filter these bad actors from accessing some or all encryption keys and/or sensitive information in the network. Herein, processing and memory usage is reduced because processing and memory resources are not made available to all entities attempting to access the network. Instead, the systems filter out bad actors and the processing and memory resources are made accessible to entities determined to be legitimate users. Further, the systems are configured to prevent resources from being wasted retrieving data and/or restoring sensitive information in the communication network. In this regard, the systems inhibit tracking of possible adverse impacts that bad actors could have caused in the network were the bad actors to reach sensitive information and/or network resources. As a result, workforce hours, processing resources, memory resources, and/or power resources are not spent retroactively tracking the actions of bad actors in the communication network.

In conventional systems, multiple vulnerabilities exist when certain logging libraries (e.g., libraries like log for Java (Log4j) libraries) are used. Logging library help developers track and record flows of programs, making the programs easier to monitor, debug, and manage applications. Several vulnerabilities exist within communication functionalities of logging libraries, where electronic attackers may inject malicious code into logs and execute the malicious code on a specific system. Use of the vulnerabilities associated with logging libraries by bad actors can lead to: 1) remote code execution, where attackers gain control of a vulnerable system and execute arbitrary code; 2) system compromise, where attackers install malware, launch further attacks, and/or gain persistent access to private networks; 3) data theft, where attackers steal sensitive information from a compromised system; and 4) denial of service, where attackers disrupt functionality of a vulnerable application or service.

With respect to 1)-4), the system disclosed herein overcomes, inhibits, and/or eliminates use of vulnerabilities associated with logging libraries. In particular, the system combines quantum cryptography and functional encryption and leveraging security properties of quantum key distribution, functional encryption integrated with Zero-Knowledge Proofs (ZKP), Trusted Execution Environment (TEE) and Secure Multi-Party Computation (SMPC) protocols to inhibit and/or eliminate tampering of sensitive information. The system enhances protection of sensitive information and configurations, even in the presence of vulnerabilities that could potentially lead to data breaches and/or unauthorized access to private networks. In some embodiments, the system integrates quantum key distribution (QKD) principles to generate and distribute quantum-generated keys to a key management system. The key management system may securely store and distribute the quantum-generated keys to an auto-cryptography component, and an SMPC component. The auto-cryptography component, executing within a secure enclave or TEE, may use the quantum-generated keys and associated functional encryption to identify and encrypt sensitive data within an application logs and configuration files, including database connection strings, encryption keys, and user data. Even if attackers abuse the vulnerabilities in logging libraries and gain access to application logs, the sensitive information remains encrypted and effectively useless without the proper decryption keys. Herein, the system provides a tamper-evident key exchange to ensure that any attempt to eavesdrop or intercept a key exchange process is be detected, preventing, inhibiting, and/or eliminating potential compromises and/or unauthorized access to the decryption keys. In some embodiments, secure communication between components is facilitated by using the quantum-generated keys for encryption and authentication, ensuring end-to-end protection of sensitive data in transit. Herein, the combination of quantum key distribution and functional encryption integrated with ZKP, TEE, and SMPC protocols provides a robust technical solution for data protection, ensuring the confidentiality and integrity of sensitive information, even in the face of evolving cyber threats.

In one or more embodiments, the systems and the methods may be performed by an apparatus, such as the server. Further, the system may be a data exchange system, which comprises the apparatus. In addition, the system and the method may be performed as part of a process performed by the apparatus. As a non-limiting example, the apparatus may comprise a memory and one or more processors communicatively coupled to one another. The one or more processors may be classical processors, quantum processors, or a combination of classical processors and quantum processors. The memory may be operable to store multiple configuration parameters guiding implementation of an encoding protocol.

A first quantum processor may be configured to generate, using a Quantum Random Number Generator (QRNG), a randomized number string comprising a first randomized number, a second randomized number, and a third randomized number. Further, the first quantum processor may be configured to encode, in accordance with the configuration parameters, the randomized number string into multiple quantum states comprising a first quantum state corresponding to the first randomized number, a second quantum state corresponding to the second randomized number, and a third quantum state corresponding to the third randomized number. The first quantum processor may be configured to transmit, over a dedicated quantum channel, the quantum states to a second quantum processor. The dedicated quantum channel may be configured to transport quantum information between the first quantum processor and the second quantum processor.

In addition, the second quantum processor may be configured to measure each of the quantum states transmitted by the first quantum processor and decode, based on the measurements of each of the quantum states, multiple representative quantum numbers comprising a first representative quantum number corresponding to the first quantum state, a second representative quantum number corresponding to the second quantum state, and a third representative quantum number corresponding to the third quantum state. Further, the second quantum processor may be configured to compare, using data exchanged in the classical channel, the representative quantum numbers to the randomized numbers. Herein, the first randomized number is compared to the first representative quantum number, the second randomized number is compared to the second representative quantum number, and the third randomized number is compared to the third representative quantum number.

The second quantum processor may be configured to determine whether the first randomized number matches the first representative quantum number, the second randomized number matches the second representative quantum number, and the third randomized number matches the third representative quantum number. Further, in response to determining that the first randomized number matches the first representative quantum number, the second randomized number does not match the second representative quantum number, and the third randomized number matches the third representative quantum number, the second quantum processor may be configured to discard the second representative quantum number. The second quantum processor may be configured to create a secure quantum encryption key based at least in part upon the first representative quantum number and the third representative quantum number and perform a key storage operation using the secure quantum encryption key.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
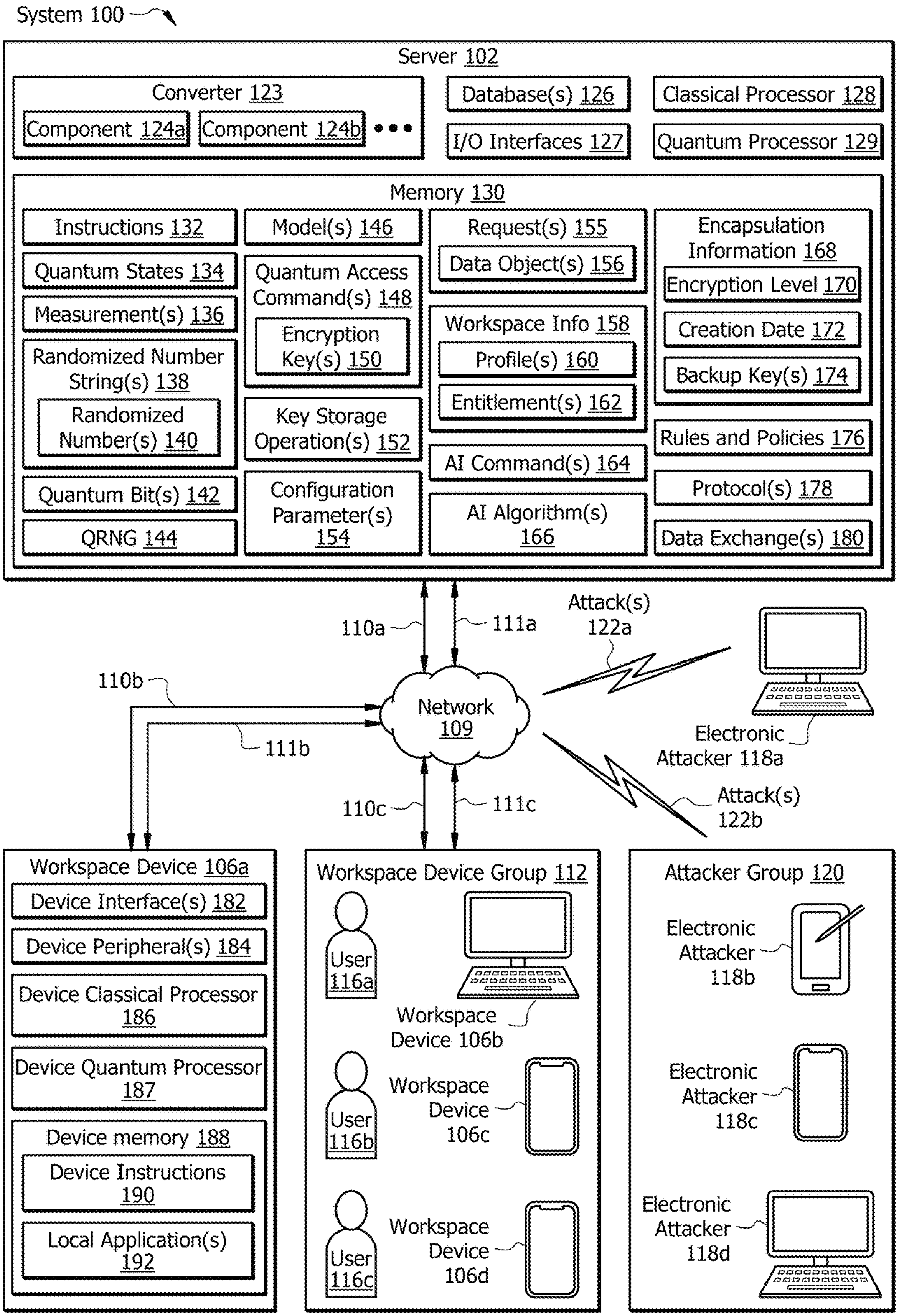
FIG. 1 illustrates a system in accordance with one or more embodiments.
Figure 2:
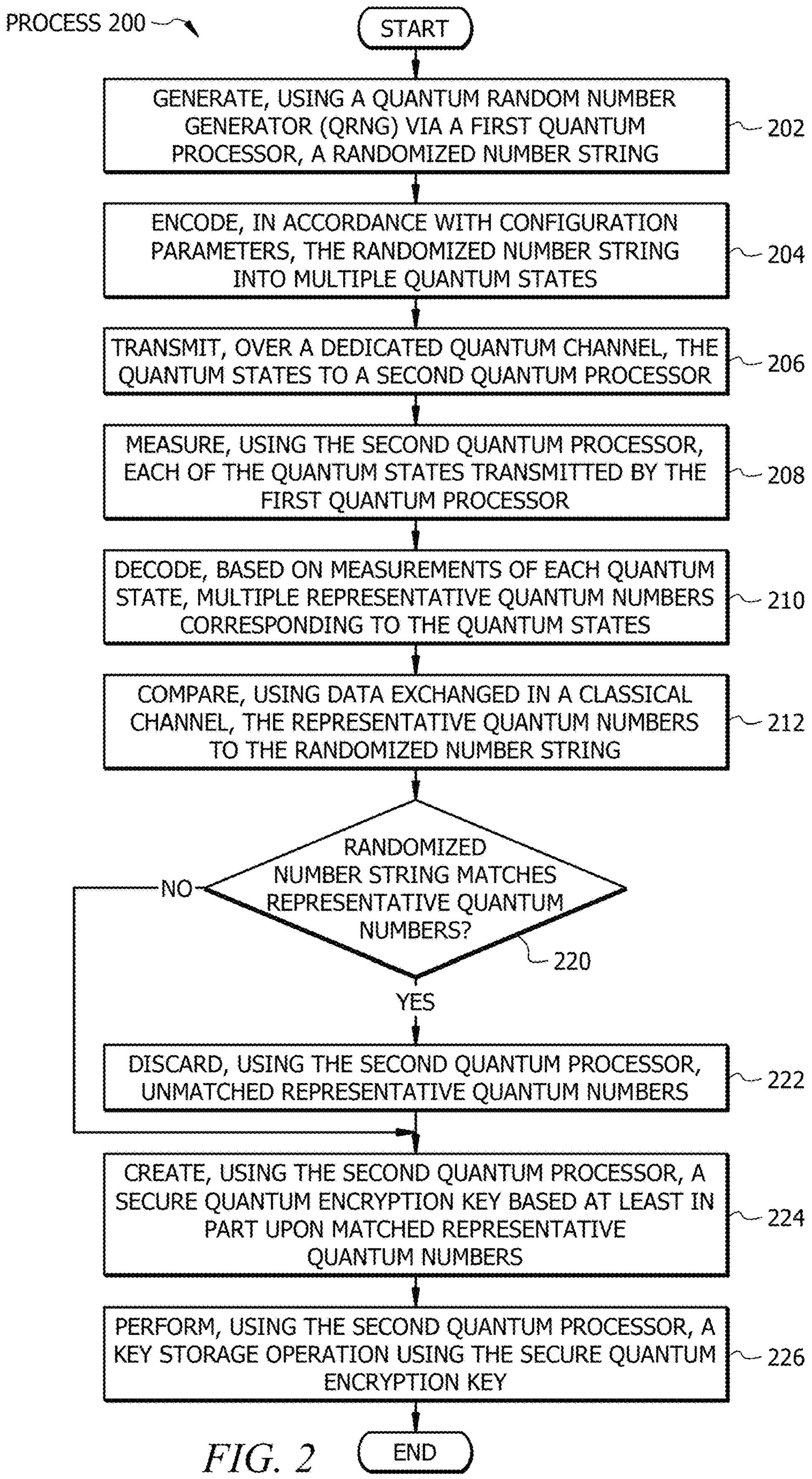
FIG. 2 illustrates an example flowchart of a method performed by the system in FIG. 1 in accordance with one or more embodiments.

As described above, this disclosure provides various systems and methods to evaluate communication operations. FIG. 1 illustrates a system 100 in which a server 102 configured to perform quantum-based operations with a workspace device 106. FIG. 2 illustrates a process 200 performed by the system 100 of FIG. 1.

System Overview

FIG. 1 illustrates an example system 100, in accordance with one or more embodiments. The system 100 may comprise a server 102 configured to perform dynamic quantum-based distribution and encryption of keys (e.g., encryption keys 104) in a network 109. The system 100 includes a server 102 communicatively coupled to a workspace device 106, a workspace device 106*b*, a workspace device 106*c*, and a workspace device 106*d* (collectively, workspace devices 106) via a network 109. In some embodiments, the system 100 comprises one or more dedicated quantum channels 110 (e.g., quantum channel 110*a*, quantum channel 110*b*, and quantum channel 110*c* among others) and one or more classical channels 111 (e.g., classical channel 111*a*, classical channel 111*b*, and classical channel 111*c* among others) communicatively coupling the network 109 to the server 102 and/or the workspace devices 106. The workspace devices 106 may be user nodes configured to trigger exchanges of data and/or perform one or more communication operations with the server 102 via the network 109. The workspace devices 106 may be working nodes configured to receive instructions to perform one or more communication operations based on instructions received from the server 102. In some embodiments, some of the workspace devices 106 may be clustered together in one or more workspace device groups 112. Each of the workspace devices 106 may be associated with one or more corresponding operators. These operators are shown as a user 116*a*, a user 116*b*, and a user 116*c* (collectively, users 116) in the workspace device groups 112. In FIG. 1, the workspace device group 112 is shown comprising the user 116*a* associated with the workspace device 106*b*, the user 116*b* associated with the workspace device 106*c*, and the user 116*c* associated with the workspace device 106*d*.

In one or more embodiments, the example of FIG. 1 shows an electronic attacker 118*a*, an electronic attacker 118*b*, an electronic attacker 118*c*, and an electronic attacker 118*d* (collectively, electronic attackers 118). In some embodiments, some of the electronic attackers 118 may be clustered together in one or more attacker groups 120. In FIG. 1, the attacker group 120 is shown comprising the electronic attacker 118*b*, the electronic attacker 118*c*, and the electronic attacker 118*d*. These electronic attackers 118 may be bad actors attempting to perform one or more attacks 122 (e.g., attacks 122*a* and attacks 122*b*) to the server 102, the workspace devices 106, the network, and/or the workspace device groups 112.

In one or more embodiments, the server 102 may comprise a converter 123 comprising a component 124*a* and a component 124*b* (collectively, components 124), one or more databases 126, one or more server input (I)/output (O) interfaces 127, at least one classical processor 128 (e.g., a server processor), at least one quantum processor 129, and at least one memory 130 communicatively coupled to one another. In some embodiments, the memory 130 may be operable to store instructions 132, one or more quantum states 134, one or more measurements 136, one or more randomized number strings 138 comprising one or more randomized numbers 140, one or more qubits 142, a Quantum Random Number Generator (QRNG) 144, one or more models 146, one or more quantum access commands 148 comprising one or more encryption keys 150, one or more key storage operations 152, one or more configuration parameters 154, one or more requests 155 comprising one or more data objects 156, workspace information 158 comprising one or more workspace profiles 160 and one or more entitlements 162, one or more artificial intelligence commands 164, one or more artificial intelligence algorithms 166, encapsulation information 168 comprising at least one encryption level 170, at least one creation date 172, and one or more backup keys 174, one or more rules and policies 176, one or more protocols 178, and/or one or more data exchanges 180.

Referring to the workspace device 106*a* a non-limiting example, the workspace device 106*a* may comprise one or more device interfaces 182, one or more device peripherals 184, at least one device classical processor 186, at least one device quantum processor 187, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the workspace devices 106), additional databases, systems, and the like, via the one or more server I/O interfaces 127 (i.e., a user interface or a network interface). The server 102 may comprise the classical processor 128 that is generally configured to oversee operations of the processing engine. The operations of the processing engine are described further below in conjunction with the system 100 described in FIG. 1, and the process 200 described in FIG. 2.

The server 102 comprises multiple databases 126 configured to provide one or more memory resources to the server 102 and/or the workspace devices 106. The server 102 comprises the classical processor 128 and the quantum processor 129 communicatively coupled with the converter 123, the databases 126, the server I/O interfaces 127, and the memory 130. The server 102 may be configured as shown, or in any other configuration. In one or more embodiments, the databases 126 are configured to store data that enables the server 102 to configure, manage and coordinate one or more middleware systems. In some embodiments, the databases 126 store data used by the server 102 to function as a halfway point in between one or more services and other tools or databases.

The converter 123 is configured to convert data items represented by classical binary bits to qubits 142. The converter 123 is further configured to convert data items represented by qubits 142 to classical binary bits. In certain embodiments, the converter 123 comprises a plurality of components 124 that are configured to generate and manipulate qubits 142. In the illustrated embodiment, the plurality of components 124 and the quantum processor 129 are configured to operate on a same type of qubits 142. For example, when the quantum processor 129 comprises a photon-based device (with qubits implemented by modes of photons), the plurality of components 124 may comprise optical components such as lasers, mirrors, prisms, waveguides, interferometers, optical fibers, filters, polarizers, and/or lenses.

In one or more embodiments, the server I/O interfaces 127 may be configured to enable wired and/or wireless communications. The server I/O interfaces 127 may be configured to communicate data between the server 102 and other workspace devices (i.e., the workspace devices 106), network devices (i.e., routers in the network 109), systems, or domain(s) via the network 109. For example, the server I/O interfaces 127 may comprise a WI-FI interface, a LAN interface, a WAN interface, a modem, a switch, or a router. The classical processor 128 may be configured to send and receive data using the server I/O interfaces 127. The server I/O interfaces 127 may be configured to use any suitable type of communication protocol. In some embodiments, the server I/O interfaces 127 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The classical processor 128 comprises one or more processors communicatively coupled to the memory 130. The classical processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The classical processor 128 may be a programmable logic device, a microcontroller, a microprocessor, or any suitable combination of the preceding. The one or more classical processor 128 are configured to process data and may be implemented in hardware or software executed by hardware. For example, the classical processor 128 may be 8-bit, 16-bit, 32-bit, 64-bit or of any other suitable architecture. The classical processor 128 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more classical processor 128 are configured to execute various instructions. For example, the one or more classical processor 128 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server T/O interfaces 127 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 127 may be configured to support any suitable type of communication protocol as would be appreciated by one of ordinary skill in the art. In one or more embodiments, the server I/O interfaces 127 may comprise one or more sensors configured to evaluate physical phenomena surrounding the server 102 and/or one or more of the workspace devices 106. The sensors may be proximity sensors, optical sensors, and the like.

The quantum processor 129 may comprise one or more quantum processors operably coupled to the memory 130. The quantum processor 129 may be configured to process qubits 142. The quantum processor 129 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements qubits with states of a respective quantum system. The quantum processor 129 may be configured to execute one or more quantum algorithms (as part of the one or more instructions 132) to perform one or more functions described herein.

The quantum processor 129 may be configured to implement a quantum algorithm (e.g., Grover's search algorithm) to execute one or more quantum operations upon executing one or more quantum access commands 148. The quantum processor 129 may be configured to initialize one or more quantum bits (e.g., the qubits 142). In certain embodiments, the quantum processor 129 may instruct the converter 123 to initialize the qubits. The quantum processor 129may be configured to apply a Hadamard operator to the qubits to generate an initial quantum state. The quantum processor 129 applies an oracle operator and a diffusion operator to a current quantum state (e.g., initial quantum state). In certain embodiments, the oracle operator comprises a Pauli X gate.

The quantum processor 129 may determine if the oracle and diffusion operators are applied to the initial quantum state for a threshold number of times. In certain embodiments, the oracle and diffusion operators may be applied to the initial quantum state one or more times until the oracle and diffusion operators are applied to the initial quantum state for the threshold number of times.

In response to determining that the oracle and diffusion operators are applied to the initial quantum state for the threshold number of times, the quantum processor 129 may be configured to identify the current quantum state as a final quantum state. The quantum processor 129 may be configured to measure the final quantum state to determine one or more values as part of the quantum operations. In certain embodiments, the quantum processor 129 may be configured to instruct the converter 123 to measure the final quantum state.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more quantum states 134, the one or more measurements 136, the one or more randomized number strings 138 comprising the one or more randomized numbers 140, the one or more qubits 142, the Quantum Random Number Generator (QRNG) 144, the one or more models 146, the one or more quantum access commands 148 comprising the one or more encryption keys 150, the one or more key storage operations 152, the one or more configuration parameters 154, the one or more requests 155 comprising the one or more data objects 156, the workspace information 158 comprising the one or more workspace profiles 160 and the one or more entitlements 162, the one or more artificial intelligence commands 164, the one or more artificial intelligence algorithms 166, the encapsulation information 168 comprising the at least one encryption level 170, the at least one creation date 172, and the one or more backup keys 174, the one or more rules and policies 176, the one or more protocols 178, and/or the one or more data exchanges 180. The instructions 132 may comprise any suitable set of instructions, logic, rules, or code operable to execute the classical processor 128. Further, the instructions 132 may comprise the one or more quantum algorithms comprising any suitable set of software instructions, logic, rules, or code operable to be executed by the quantum processor 129.

The quantum states 134 may be one or more physical positions associated with one or more qubits 142. The quantum states 134 may be obtained from one or more superposition states, which may represent both 0 (e.g., zero) and 1 (e.g., one) simultaneously. In this regard, the quantum states 134 may represent a value of 0 (e.g., zero), 1 (e.g., one), and/or one or more superposition states. In some embodiments, the quantum states 134 may be configured in quantum state vectors. The quantum state vectors may be two-dimensional complex vector configured to provide quantum information on a single qubit 142. The quantum state vectors may contain information used to describe one-qubit quantum systems.

The measurements 136 may be one or more collapsed superpositions showing values of 0 (e.g., zero) or 1 (e.g., one). The measurements 136 may be categorized as full system measurements or mid-circuit measurements. In the full system measurements, all qubits 142 in a data set may be measured at once to capture a final output. In mid-circuit measurements, during computational processes, qubits 142 in a data set may be partially measured to enhance algorithmic capabilities and/or enabling operations conditional to these measurements.

The randomized number strings 138 may be one or more information elements comprising any combination of letters, numbers, and/or symbols. The randomized number strings 138 may be configured in one or more different formats. The randomized number strings 138 may be generated using a randomization algorithm. The randomization algorithm may be configured with an unpredictable value selection system that receives a length condition and generates randomized numbers 140 containing information elements that meets the length condition. Additional processes for creating one or more randomized strings 138 may be used. The randomized numbers 140 may be a set of numbers simulating the appearance of one or more quantum states 134.

The quantum bits (e.g., qubits 142) may be quantum elements of data configured to be stored to interact with the quantum processor 129 in one or more quantum states 134. The quantum processor 129 may not rely on mathematical algorithms but on laws of quantum physics to generate true random numbers and provide high security. Every alphanumeric data which is available in a source may assign with true random number may make data entry unique. The quantum processor 129 may comprise setting up the qubits 142 that exist in one of two alternative binary digits. The qubits 142 may be used to store the encryption keys 150 as part of the authentication operations. In some embodiments, quantum processor 129 may be configured to identify a true value of the qubits 142.

The QRNG 144 may be configured to perform one or more QRNG operations. The one or more QRNG operations may be configured to convert datapoints associated with one or more classical bits into multiple intermediate values. The one or more QRNG operations may be configured to index the intermediate values as indexed data. In some embodiments, the one or more QRNG operations may be performed multiple times from multiple pieces of structured data and/or unstructured data collected, received, and/or otherwise obtained by the server 102. The QRNG operations may be configured to group individual elements (e.g., individual letters in text strings) of data based on symbols and/or alphanumeric characters used. In this regard, the datapoints may be representative of individual elements. The QRNG operations may not rely on mathematical algorithms but on laws of quantum physics to generate true random numbers and provide high security. Every alphanumeric data which is available in a source assign with true random number may make data entry unique. The QRNG operations may comprise setting up quantum bits (e.g., qubits 142) that exists in one of two alternative binary digits. The qubits 142 may be used to store the datapoints as part of the QRNG operations. In some embodiments, quantum processor 128 may be configured to identify a true value of the qubits 142.

The one or more quantum access commands 148 may be one or more indicators configured to provide information associated with one or more operations of the entities accessing the network 109. The quantum access commands 148 may be stored in one or more quantum formats. The quantum processor 129 may be configured to generate the one or more quantum access commands 148 based on access feedback. In this regard, the quantum access commands 148 may be information indicating modifications and/or assignments of resources in the network 109. The quantum access commands 148 may be replaced, updated, and/or modified dynamically. The quantum access commands 148 may be replaced, updated, and/or modified periodically. The quantum access commands 148 may comprise results of one or more operations of the processing engine configured to perform as authentication operations that retrieve and analyze the access feedback. The quantum access commands 148 may comprise one or more encryption keys 150 generated to verify an identity of the one or more entities. The quantum access commands 148 may be one or more triggers configured to enable access between a workspace device 106 determined to perform one or more legitimate communication operations. The quantum access commands 148 may be quantum access commands generated by the quantum processor 129 configured to generate encryption keys 150 comprising one or more quantum states. The encryption keys 150 may be passkeys, passwords, communication strings, alphanumeric characters, and/or data elements comprising one or more quantum encryptions.

The key storage operations 152 may be one or more operations in which quantum keys and/or other encryption keys 150 are stored in one or more databases 126. The quantum keys and/or other encryption keys 150 may be stored, routed, and/or communicated using one or more dedicated communication channels. In this regard, the encryption keys 150 may be transmitted in the network 109 using the quantum channels 110. For example, an encryption key 150 shared from the server 102 to the workspace device 106, the encryption key 150 is transmitted over the quantum channel 110*a* and the quantum channel 110*b*. In some embodiments, the classical channels 111 may be configured to exchange information confirming storage and/or processing of quantum information.

The configuration parameters 154 may be configured to guide implementation of one or more encoding protocols 178. The configuration parameters 154 may instruct operation arrangements of one or more of the services and/or one or more configuration aspects of the workspace devices 106 over a period of time. The configuration parameters 154 may at least be partially based on the requests 155.

The encoding protocols 178 may be one or more processes or methods used to represent data in a specific format for efficient transmission or storage. The encoding protocols 178 may ensure data integrity and interoperability across different systems and application. The system 100 may be configured to integrate quantum key distribution (QKD) principles with secure enclave protocols and Secure Multi-Party Computation (SMPC) protocols to ensure secure generation, distribution, and management of cryptographic keys. Further, the protocols 178 may comprise Zero-Knowledge Proofs (ZKP) protocols, Trusted Execution Environment (TEE) protocols and SMPC protocols.

The ZKP protocols are processes or methods by which one party (e.g., a prover) proves to another party (e.g., a verifier) that something is true, without revealing any information apart from the fact that a specific statement is true. The ZKP protocols may be configured to enable an auto-cryptography component to prove a correct identification and encryption of sensitive data without revealing plaintext information. The ZKP protocols may be secured by the quantum-generated keys. The TEE protocols comprise a segregated area of a memory and a CPU that is protected from the rest of the CPU using encryption. Any data in the TEE may not be read or tampered with by any code outside that environment. Data may be manipulated inside the TEE by suitably authorized code (e.g., key). The secure enclave and/or TEE may be a component that represents execution of auto-cryptography components within a secure enclave or TEE, providing an isolated and trusted environment for sensitive operations and secure storage of the quantum-generated keys. The SMPC protocols may enable multiple parties to jointly compute a function based on private inputs without revealing those inputs to each other, ensuring data privacy and security.

The requests 155 may be one or more communications configured to provide triggers in the form of communication or control signals to start operations such as fetching the instructions 132 or running one or more of the authentication operations. The requests 155 may provide workspace information 158 to the server 102 to indicate at least one device profile 160 associated with one or more of the entitlements 162 to access and/or modify any of the applications available in the server 102. In some embodiments, the requests 155 may be configured to provide lists, security information, and configuration commands that the server 102 uses to set up a specific service for one of the workspace devices 106. The requests 155 may comprise data that provides starting procedure configuration to the server 102. In one or more embodiments, the requests 155 may be optimized instructions that trigger establishing of a specific procedure in the server 102.

The data objects 156 may be portions of information associated with one or more communications comprising data exchanges 180. A data object 156 may be a representation or indicator associated with a digital account, one of the workspace devices 106, and/or the server 102. The data exchanged may comprise one or more data objects 156 associated with one or more incoming requests 155 and/or one or more data objects 156 associated with one or more outgoing responses. In some embodiments, the data exchanged may comprise data object information to be exchanged between the workspace devices 106 and/or the server 102.

The workspace information 158 may comprise the one or more profiles 160, one or more entitlements 162, and one or more services. In one or more embodiments, the profiles 160 may comprise multiple profiles associated with one or more entitlements 162 to access and/or modify the services. Each of the profiles 160 may be associated with one or more entitlements 162. The entitlements 162 may indicate that a given workspace device 106 is allowed to access one or more network resources in accordance with the one or more rules and policies 176. The entitlements 162 may indicate that a given workspace device 106 is allowed to perform one or more operations in the system 100 (e.g., provide a specific application data access to one of the users 116). To secure or protect operations of the workspace devices 106 from bad actors, the entitlements 162 may be assigned to a given profile 160 in accordance with updated security information, which may provide guidance parameters to the use of the entitlements 162 based at least upon corresponding rules and policies 176. In one or more embodiments, the one or more services perform one or more application operations using the quantum access commands 148 and/or the encryption keys 150. In some embodiments, the profiles 160 may comprise multiple profiles for the users 116. Each profile 160 may comprise one or more entitlements 162. As described above, the entitlements 162 may indicate that a given user 116 is allowed to access one or more network resources in accordance with one or more rules and policies 176. The entitlements 162 may indicate that a given user 116 is allowed to perform one or more data exchanges with the server 102 via the network 109. In one or more embodiments, each of the profiles 160 may comprise information about at least one user 116 entitled to trigger one or more communication operations.

In one or more embodiments, the artificial intelligence algorithms 166 may be executed by the classical processor 128 to evaluate the communication operations and/or the access feedback. Further, the artificial intelligence algorithms 166 may be configured to interpret and transform the requests 155 and/or the instructions 132 into structured data sets and subsequently stored as files or tables. The artificial intelligence algorithms 166 may cleanse, normalize raw data, and derive intermediate data to generate uniform data in terms of encoding, format, and data types. The artificial intelligence algorithms 166 may be executed to run user queries and advanced analytical tools on the structured data and/or the unstructured data in accordance with one or more models 146. The artificial intelligence algorithms 166 may be configured to generate the one or more AI commands 164 based on one or more results of the testing operations. The AI commands 164 may be parameters that proactively trigger one or more of the authentication operations. The AI commands 164 may be combined with the existing instructions 132 to dynamically trigger and/or perform the data authentication operations and/or some or all of the communication operations. The AI commands 164 may be configured to trigger one or more cognitive AI operations in accordance with one or more models 146. The models 146 may be trained by the one or more artificial intelligence algorithms 166 based on historic information associated with any authentication operations performed with the server 102.

The encapsulation information 168 may be information that is assigned to an encryption key 150. The encapsulation information 168 may be assigned to increase encryption and/or protection of the encryption key 150. The encapsulation information 168 may be provided to concatenate with the encryption key 150 and/or increase metadata associated with the encryption key 150. In some embodiments, the encapsulation information 168 may comprise at least one encryption level 170, a creation date 172, and at least one backup key 174. The encryption level 170 may be a tiering level associated with the encryption and/or decryption of a specific encryption key 150. The encryption level 170 may be configured to provide one or more communication restrictions to the encryption key 150 after being concatenated with the encapsulation information 168. The creation date 172 may be a date value associated with a creation of an encryption key 150. The backup keys 174 may be one or more mirroring keys configured to provide additional coverage for usage of the encryption key 150.

The rules and policies 176 may be security configuration commands or regulatory operations predefined by an organization or one or more users 116. In one or more embodiments, the rules and policies 176 may be dynamically defined by the one or more users 116. The rules and policies 176 may be prioritization rules configured to instruct one or more workspace devices 106 to perform one or more evaluating operations or perform one or more operations in the system 100 in a specific communication operation. The one or more rules and policies 176 may be predetermined or dynamically assigned by a corresponding user 116 or an organization associated with the users 116.

The data exchanges 180 may be one or more data exchange operations performed in conjunction with one or more communication operations. The one or more data exchange operations may be one or more operations configured to convert one or more data elements to obtain, distribute, and/or modify one or more data objects 156. Further, the data exchange operations may be one or more operations configured to modify and/or exchange data objects 156 after being triggered by one or more requests 155. The one or more requests 155 may be one or more information strings, alphanumeric data, and/or configuration commands to be exchanged in a data network. In one or more embodiments, the data exchange operations are configured to create, analyze, manage, and update one or more encryption keys 150.

The one or more communication operations may be one or more data exchanges performed between two or more network devices in the system 100. The network devices may comprise the server 102 and one or more of the workspace devices 106, among others. In one or more embodiments, the communication operations may be audio communications exchanged as part of audio conversations (e.g., during a telephonic call) between two or more network devices. The communication operations may be image and/or text communications exchanged as part of image-based conversations (e.g., during videocalls and/or chat exchanges) between two or more network devices.

The authentication operations may be one or more operations executed by the classical processor 128 configured to enable data objects to be exchanged between the workspace devices 106 and/or the server 102. In one or more embodiments, the authentication operations may be configured to indicate one or more data objects (e.g., via the communication operations) to be exchanged between the server 102 and at least one of the workspace devices 106. The authentication operations may be configured to generate and analyze one or more communication operations to confirm whether one or more entities associated with communication operations are legitimately associated with at least one of the workspace devices 106. The authentication operations may be one or more operations in which the server 102 is configured to confirm whether one or more communication operations belong to a specific workspace device 106.

In one or more embodiments, the databases 126 may be one or more repositories configured to store information. In one example, the server 102 may determine the classical processor 128 and/or the quantum processor 129 are available (e.g., running) to perform a specific service. In another example, the server 102 may determine that a specific managed server is running to enable a testing application and/or perform the specific service upon receiving a server response indicating that a corresponding managed server is available to perform the service. The databases 126 may be configured to store one or more representations of data instead of storing coded data. In this regard, the representations may be encoded in accordance with an encoder configured to identify and/or verify exchanged information. For example, the databases 126 may comprise one or more representations of the access feedback and/or the quantum access commands 148. As the access feedback is obtained, the classical processor 128 may be configured to process the access feedback in accordance with the one or more authentication operations.

Workspace Device

In one or more embodiments, each of the workspace devices 106 (e.g., the workspace device 106*a*, the workspace devices 106*b*-106*d* in the workspace device group 112) may be any computing device configured to communicate with other devices, such as the server 102, other workspace devices 106 in the workspace device group 112, databases, and the like in the system 100. Each of the workspace devices 106 may be configured to perform specific functions described herein and interact with the server 102 and/or any other workspace devices 106. Examples of the workspace devices 106 comprise, but are not limited to, a laptop, a computer, a smartphone, a tablet, a smart device, an IoT device, a simulated reality device, an augmented reality device, or any other suitable type of device. The requests 155 may be provided by the workspace devices 106 via one or more interfaces comprising input displays, voice microphones, or sensors capturing gestures performed by a corresponding user 116.

The workspace devices 106 may be hardware configured to create, transmit, and/or receive information. The workspace devices 106 may be configured as a provider node or as worker nodes. The workspace devices 106 may be configured to receive inputs from a user, process the inputs, and generate data information or command information in response. The data information may include documents or files generated using a graphical user interface (GUI).

Referring to the workspace device 106*a* as a non-limiting example, the command information may include input selections/commands triggered by a user using a peripheral component or one or more device peripherals 184 (i.e., a keyboard) or an integrated input system (i.e., a touchscreen displaying the GUI). The workspace devices 106 may be communicatively coupled to the server 102 via a network connection (i.e., the device peripherals 184). The workspace devices 106 may transmit and receive data information, command information, or a combination of both to and from the server 102 via the device interfaces 182. In one or more embodiments, the workspace devices 106 are configured to exchange data, commands, and signaling with the server 102. In some embodiments, the workspace devices 106 are configured to receive at least one security system configuration from the server 102 to implement a security system (one of the one or more local applications 192) at one of the workspace devices 106.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional workspace devices 106, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the workspace devices 106. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device classical processor 186 may comprise one or more processors communicatively coupled to and in signal communication with the device interfaces 182, the device peripherals 184, and the device memory 188. The device classical processor 186 is any electronic circuitry, including, but not limited to, state machines, one or more CPU chips, logic units, cores (e.g., a multi-core processor), FPGAs, ASICs, or DSPs. The device classical processor 186 may be a programmable logic device, a microcontroller, a microprocessor, or any suitable combination of the preceding. The one or more processors in the device classical processor 186 are configured to process data and may be implemented in hardware or software executed by hardware. For example, the device classical processor 186 may be an 8-bit, a 16-bit, a 32-bit, a 64-bit, or any other suitable architecture. The device classical processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device classical processor 186 may be configured to execute various instructions (e.g., the device instructions 190).

The device quantum processor 187 may comprise one or more processors communicatively coupled to and in signal communication with the device interfaces 182, the device peripherals 184, the device classical processor 186, and the device memory 188. The device quantum processor 187 may comprise one or more quantum processors operably coupled to the device memory 188. The device quantum processor 187 may be configured to process qubits 142. The device quantum processor 187 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements qubits with states of a respective quantum system. The quantum processor 129 may be configured to execute one or more quantum algorithms (as part of the one or more instructions 132) to perform one or more functions described herein. The device quantum processor 187 may be configured to execute various instructions (e.g., the device instructions 190). The device quantum processor 187 may be configured to perform one or more operations associated with the quantum processor 129 in the server 102.

The device memory 188 may comprise multiple operation data and one or more local applications 192 associated with the server 102. The operation data may be data configured to enable one or more data processing operations such as those described in relation with the server 102. The operation data may be partially or completely different from those comprised in the memory 130. The local applications 192 may be one or more of the services described in relation with the server 102. In some embodiments, the local applications 192 may be partially or completely different from those comprised in the memory 130.

Network

The network 109 facilitates communication between and amongst the various devices of the system 100. The network 109 may be any suitable network operable to facilitate communication between the server 102 and the workspace devices 106 of the system 100. The network 109 may include any interconnecting system capable of transmitting audio, video, signals, data, data packets, messages, or any combination of the preceding. The network 109 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

In some embodiments, the dedicated quantum channels 110 may be one or more communication links and/or channels configured to transmit quantum data and/or quantum-based data without modifying and/or altering a value associated with a qubit 142. The one or more classical channels 111 may be one or more communication links and/or channels associated with transfers of classical data.

Electronic Attacker

In one or more embodiments, electronic attackers 118 may be any electronic device that influences the operations of one or more devices in the network 109. In some embodiments, the electronic attacker group 120 comprises multiple devices configured to interfere with operations of devices in the network 109. The attacker group 120 comprises the electronic attacker **118*b*, the electronic attacker 118*c*, and the electronic attacker 118*d*. Each of the electronic attackers may perform one or more attacks 122 (e.g., attacks 122*a* and attacks 122*b*). The electronic attacks 122 may be one or more unexpected operations triggered by the electronic attackers 118 in the network 109. In some embodiments, a single electronic attacker 118 may perform one or more attacks 122*a*. In other embodiments, multiple electronic attackers 118 (e.g., the attacker 118*b*, the attacker 118*b*, and the attacker 118*d* in the attacker group 120) may perform one or more attacks 122*b***.

Referring as a non-limiting example to the electronic attacker **118*a* of FIG. 1, the electronic attacker 118*a* may be hardware and/or software, executed by hardware, which launches the attacks 122*a* to affect the operations performed by the server 102 and/or the workspace devices 106. Although not explicitly shown in FIG. 1, the electronic attacker 118*a* may include a processor, a memory, and a transceiver configured to generate one or more communication signals. In one or more embodiments, the electronic attacker 118*a* is a new device in a predetermined area in which the server 102 and/or the workspace devices 106 are located. In some embodiments, radio waves, electromagnetic (EM) signaling, and/or communication operations from the electronic attacker 118*a* are monitored over time in the network 109** to be evaluated in combination with one or more authentication operations.

In one or more embodiments, the electronic attacker **118*a* may be a person, people, or an automated electric component that use the attacks 122*a* to hack communications and operations of a specific workspace device 106 and/or the server 102. As a result of the attacks 122*a*, the electronic attacker 118*a* may control communications or operations of one or more of the hacked workspace devices 106. In this regard, the electronic attacker 118*a* may modify, cancel, or generate communications or operations in the hacked workspace devices 106. The electronic attacker 118*a* may pretend to perform one or more operations on behalf of one or more of the workspace devices 106**.

Operational Flow

In conventional systems, applications and/or cloud-based services use keys that may be prone to attacks. As an attack surface expands, possibility of adverse impacts (e.g., data breaches and unauthorized access to sensitive information) increases. In conventional systems, traditional cryptographic methods may not effectively manage cryptographic keys and enforce consistent encryption policies across a distributed infrastructure. One or more of the operations described in reference to components or subcomponents in this section may be performed by one or more of the server 102 and/or the workspace devices 106.

In one or more embodiments, the system 100 comprises one or more quantum cryptography operations that rely on the principles of quantum mechanics to securely handle the encryption and/or decryption keys while efficiently detecting and mitigating eavesdropping attempts. The system 100 may be configured to leverage quantum cryptography to ensure secure and tamper-evident key exchanges.

In one or more embodiments, the system 100 integrates quantum key distribution (QKD) principles with secure enclave and SMPC protocols to ensure secure generation, distribution, and/or management of cryptographic keys. The quantum-generated keys may be then used to automatically encrypt and/or decrypt sensitive data within web application configuration files and other components of an infrastructure.

In one or more embodiments, an operational flow performed by the system 100 may start by using a Quantum Random Number Generator (QRNG) 144, which generates random numbers (e.g., randomized numbers 140) by abusing randomness in quantum mechanical phenomena, such as photon polarization and/or spin of subatomic particles. The random numbers may be used to encode quantum states 134, forming a basis for secure key exchanges. Then, a quantum state preparation and transmission may encode the random numbers generated by the QRNG 144 into the quantum states 134, using photons or other quantum particles. A choice of encoding method (e.g., polarization, phase, or other properties) may be based on a specific quantum cryptography protocol being used (e.g., BB84, E91, or the like). In a financial institution scenario, a quantum transmitter at a main data center (e.g., the server 102) may encode the random numbers into the quantum states 134 and transmit the quantum states 134 over a dedicated quantum channel 110 (e.g., a fiber-optic cable) to a workspace device 106. In some embodiments, the workspace device 106 may be configured to measure the quantum states 134 transmitted by the quantum transmitter. Herein, due to principles of quantum mechanics, such as the no-cloning theorem and the uncertainty principle, any attempt to measure or eavesdrop on the quantum states 134 may inevitably introduce disturbances or errors. A quantum receiver at the workspace device 106 may measure incoming quantum states 134 and generate a corresponding string of random numbers, which may serve as a basis for a shared encryption key 150.

In one or more embodiments, the operational flow may comprise quantum key sifting and eavesdropping detection configured to, after the quantum state transmission and measurement, detect any potential eavesdropping attempts by comparing a subset of the transmitted and received quantum states over a classical communication channel 110. If an eavesdropper attempts to intercept or measure the quantum states 134 during transmission, the act of measurement may introduce disturbances or errors in the quantum states 134. These disturbances may be detected by the quantum key sifting module, allowing the system 100 to identify and discard any compromised portions of the key. If no eavesdropping is detected, the operational flow may proceed to generate a shared encryption key 150 from the remaining, undisturbed quantum states 134. Further, once the quantum key sifting module identifies and discards any compromised portions of the encryption key 150, the remaining undisturbed quantum states 134 may be used to generate a final, secure encryption key 150. This secure encryption key 150 may then be used for encrypting and decrypting sensitive data transmissions between the main data center and the workspace device 106.

In the event of an eavesdropping attempt being detected, the operational flow may end, and a new key exchange may be initiated, ensuring that no compromised keys are ever used for encryption. By leveraging the principles of quantum mechanics and the inherent tamper-evident nature of quantum cryptography, this process ensures the secure generation, exchange, and detection of eavesdropping attempts for encryption keys. The use of dedicated quantum channels 110 and the inability to measure or clone quantum states 134 without introducing detectable disturbances provides an unconditional level of security for key exchange.

In one or more embodiments, the system 100 is configured to act as a centralized key management system, responsible for securely storing, distributing, and managing lifecycles of one or more quantum-generated keys. The system 100 may be configured to securely store the quantum-generated keys, potentially using hardware security modules (HSMs), and/or secure enclaves. Herein, a key distribution module may be responsible for securely transmitting the quantum-generated keys to the auto-cryptography component, as well as handling key rotation and revocation processes. A key backup and recovery module ensures that keys are securely backed up and recovered in case of system failures or other incidents. An auditing and reporting module may be configured to provide logging, monitoring, and reporting capabilities for compliance and security purposes.

In some embodiments, the system 100 may comprise an auto-cryptography component configuration file parser. The parser may be configured to analyze web configuration files and identify sensitive information based on predefined rules and/or policies. The system 100 may be configured to perform data classification, which categorizes identified sensitive data based on criticality and sensitivity levels. The system 100 may be configured to perform encryption and/or decryption, which encrypts and/or decrypts sensitive data. The system 100 may be configured to perform secured storage, by managing secure hardware.

In one or more embodiments, the system 100 may comprise a secure multi-party computation (SMPC) component following SMPC protocols. The SMPC component may be configured to enable secure collaboration and computation among different components of a web application infrastructure during the auto-cryptography process, leveraging the quantum-generated keys to ensure the security and privacy of the computations performed across multiple parties.

The system 100 may comprise a web application infrastructure configured to represent web servers, application servers, and database servers that utilize encrypted web configuration files and participate in secure collaboration and computation enabled by SMPC component.

Example Process to Perform Dynamic Quantum-Based Distribution and Encryption of Keys in a Network FIG. 2 illustrates an example flowchart of a process 200 configured to perform dynamic quantum-based distribution and encryption of keys in a network, in accordance with one or more embodiments. Modifications, additions, or omissions may be made to the process 200. The process 200 may comprise more, fewer, or other operations than those shown in FIG. 2. For example, operations may be performed in parallel or in any suitable order. While at times discussed as the server 102, the workspace devices 106, or components of any of thereof performing operations described in operations 202-226 in the process 200, any suitable system or components of the system 100 may perform one or more operations of the process 200. For example, one or more operations of the process 200 may be implemented, at least in part, in the form of instructions 132 of FIG. 1, stored on non-transitory, tangible, machine-readable media (e.g., a non-transitory computer-readable medium such as memory 130 of FIG. 1) that when run by one or more processors (e.g., the classical processor 128 of FIG. 1) may cause the one or more processors to perform operations described in operations 202-226.

The process 200 starts at operation 202, where the server 102 may be configured to generate, using a Quantum Random Number Generator (QRNG) 144 via a first quantum processor (e.g., quantum processor 129), a randomized number string 138. For example, the server 102 may be configured to generate, using the QRNG 144, via the first quantum processor, the randomized number string 138 may comprise a first randomized number, a second randomized number, and a third randomized number. At operation 204, the server 102 is configured to encode, in accordance with one or more configuration parameters 154, the randomized number string 138 into multiple quantum states 134. For example, the server 102 may be configured to encode, in accordance with one or more configuration parameters 154, the randomized number string 138 into quantum states 134 comprising a first quantum state corresponding to the first randomized number, a second quantum state corresponding to the second randomized number, and a third quantum state corresponding to the third randomized number. At operation 206, the server 102 is configured to transmit, over one or more dedicated quantum channels 110, the quantum states 134 to a second quantum processor (e.g., device quantum processor 187 in the workspace device 106*a*). Herein, the dedicated quantum channel 110 may be configured to transport quantum information between the first quantum processor and the second quantum processor. At operation 208, the workspace device 106*a* is configured to measure, using the second quantum processor, each of the quantum states 134 transmitted by the first quantum processor. At operation 210, the workspace device 106*a* is configured to decode, based on measurements 136 of each quantum state 134, multiple representative quantum numbers corresponding to the quantum states 134. For example, the workspace device 106*a* may be configured to decode, based on measurements 136 of each of the quantum states 134. The representative quantum numbers may comprise a first representative quantum number corresponding to the first quantum state, a second representative quantum number corresponding to the second quantum state, and a third representative quantum number corresponding to the third quantum state. At operation 212, the workspace device 106*a* is configured to compare, using data exchanged in a classical channel 110 with the server 102, the representative quantum numbers to the randomized number string 138. For example, the first randomized number may be compared to the first representative quantum number, the second randomized number may be compared to the second representative quantum number, and the third randomized number may be compared to the third representative quantum number.

At operation 220, the workspace device 106*a* is configured to determine whether the randomized number string 138 matches the representative quantum numbers. If the workspace device 106*a* determines that the randomized number string 138 does not match the representative quantum numbers (e.g., NO), the process 200 proceeds to operation 224. If the workspace device 106*a* determines that the randomized number string 138 matches the representative quantum numbers (e.g., YES), the process 200 proceeds to operation 222. At operation 222, the workspace device 106*a* is configured to discard, using the second quantum processor, unmatched representative quantum numbers.

In one or more embodiments, in response to determining that none of randomized numbers 140 in the randomized number string 138 match corresponding representative quantum numbers in the representative quantum numbers, the workspace device 106*a* may be configured to tag the dedicated quantum channel 111 as being compromised. At this stage, the workspace device 106*a* may be configured to block future data exchanges 180 between the first quantum processor and the second quantum processor using the dedicated quantum channel 111.

The process 200 may end at operation 224 and operation 226, where the server 102 may be configured to further generate and distribute one or more quantum access commands 148. At operation 224, the workspace device 106*a* is configured to create, using the second quantum processor, a secure quantum encryption key 150 based at least in part upon matched representative quantum numbers. At operation 226, the workspace device 106*a* is configured to perform, using the second quantum processor, a key storage operation 152 using the secure quantum encryption key 150.

In one or more embodiments, the first quantum processor may be associated with an additional server communicatively coupled to the network 109 and the second quantum processor may be associated with the server 102.

In some embodiments, the workspace device 106*a* may be configured to, in conjunction with performing the key storage operation 152, assign, using the second quantum processor, encapsulation information 168 to the secure quantum encryption key 150. The encapsulation information 168 may comprise an encryption level 170, a creation date 172, and at least one backup key 174. The workspace device 106*a* may be configured to provide, using the second quantum processor, an encapsulated version of the secure quantum encryption key 150 to a classical processor (e.g., the classical processor 128). The workspace device 106*a* may be configured to receive, using the second quantum processor, a request 155 to secure data objects 156 via a communication interface (e.g., one of the I?O interfaces 127), determine, using the second quantum processor, whether there is a first encryption level 170 associated with the data objects 156, and determine, using the second quantum processor, a second encryption level 170 associated with the secure quantum encryption key 150. The second encryption level 170 may be proportional to a percentage of the quantum states 134 used to create the secure quantum encryption key 150.

In one or more embodiments, the workspace device 106*a* may be configured to determine, using the second quantum processor, whether the first encryption level 170 is equal to the second encryption level 170 and, in response to determining that the first encryption level 170 is equal to the second encryption level 170, encrypt, in accordance with an encryption protocol 178, the data objects 156 using the secure quantum encryption key 150. The encryption protocol 178 may comprise a Zero-Knowledge Proofs protocol, a Trusted Execution Environment protocol, or a Secure Multi-Party Computation protocol. In some embodiments, the encryption keys 150 may be generated using all quantum states 134. In other embodiments, the encryption keys 150 may not be generated because all quantum states 134 are corrupted.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory operable to store:

a plurality of configuration parameters guiding implementation of an encoding protocol;

a first quantum processor communicatively coupled to the memory and configured to:

generate, using a Quantum Random Number Generator (QRNG), a randomized number string comprising a first randomized number, a second randomized number, and a third randomized number;

encode, in accordance with the plurality of configuration parameters, the randomized number string into a plurality of quantum states comprising a first quantum state corresponding to the first randomized number, a second quantum state corresponding to the second randomized number, and a third quantum state corresponding to the third randomized number; and transmit, over a dedicated quantum channel, the plurality of quantum states to a second quantum processor, the dedicated quantum channel being configured to transport quantum information between the first quantum processor and the second quantum processor; and the second quantum processor communicatively coupled to the first quantum processor via the dedicated quantum channel and a classical channel, and configured to:

measure each of the plurality of quantum states transmitted by the first quantum processor;

decode, based on measurements of each of the plurality of quantum states, a plurality of representative quantum numbers comprising a first representative quantum number corresponding to the first quantum state, a second representative quantum number corresponding to the second quantum state, and a third representative quantum number corresponding to the third quantum state;

compare, using data exchanged in the classical channel, the plurality of representative quantum numbers to the randomized number string, wherein:

the first randomized number is compared to the first representative quantum number;

the second randomized number is compared to the second representative quantum number; and the third randomized number is compared to the third representative quantum number;

determine whether the first randomized number matches the first representative quantum number, the second randomized number matches the second representative quantum number, and the third randomized number matches the third representative quantum number;

in response to determining that the first randomized number matches the first representative quantum number, the second randomized number does not match the second representative quantum number, and the third randomized number matches the third representative quantum number, discard the second representative quantum number;

create a secure quantum encryption key based at least in part upon the first representative quantum number and the third representative quantum number; and perform a key storage operation using the secure quantum encryption key.

2. The system of claim 1, wherein the second quantum processor is further configured to:

in conjunction with performing the key storage operation, assign encapsulation information to the secure quantum encryption key, the encapsulation information comprising encryption level, creation date, and at least one backup key; and provide an encapsulated version of the secure quantum encryption key to a classical processor.

3. The system of claim 1, wherein the second quantum processor is further configured to:

receive a request to secure a plurality of data objects via a communication interface;

determine whether there is a first encryption level associated with the plurality of data objects;

determine a second encryption level associated with the secure quantum encryption key, the second encryption level being proportional to a percentage of the plurality of quantum states used to create the secure quantum encryption key;

determine whether the first encryption level is equal to the second encryption level; and in response to determining that the first encryption level is equal to the second encryption level, encrypt, in accordance with an encryption protocol, the plurality of data objects using the secure quantum encryption key.

4. The system of claim 3, wherein:

the encryption protocol comprises a Zero-Knowledge Proofs protocol.

5. The system of claim 3, wherein:

the encryption protocol comprises a Trusted Execution Environment protocol.

6. The system of claim 3, wherein:

the encryption protocol comprises a Secure Multi-Party Computation protocol.

7. The system of claim 1, wherein:

the first quantum processor is further configured to:

generate, using the QRNG, an additional randomized number string comprising a fourth randomized number, a fifth randomized number, and a sixth randomized number;

encode, in accordance with the plurality of configuration parameters, the additional randomized number string into an additional plurality of quantum states comprising a fourth quantum state corresponding to the fourth randomized number, a fifth quantum state corresponding to the fifth randomized number, and a sixth quantum state corresponding to the sixth randomized number; and transmit, over the dedicated quantum channel, the additional plurality of quantum states to a fifth quantum processor; and the second quantum processor is further configured to:

measure each of the additional plurality of quantum states transmitted by the first quantum processor;

decode, based on the measurements of each of the additional plurality of quantum states, an additional plurality of representative quantum numbers comprising a fourth representative quantum number corresponding to the fourth quantum state, a fifth representative quantum number corresponding to the fifth quantum state, and a sixth representative quantum number corresponding to the sixth quantum state;

compare, using additional data exchanged in the classical channel, the additional plurality of representative quantum numbers to the additional randomized number string, wherein:

the fourth randomized number is compared to the fourth representative quantum number;

the fifth randomized number is compared to the fifth representative quantum number; and the sixth randomized number is compared to the sixth representative quantum number;

determine whether the fourth randomized number matches the fourth representative quantum number, the fifth randomized number matches the fifth representative quantum number, and the sixth randomized number matches the sixth representative quantum number;

in response to determining that the fourth randomized number matches the fourth representative quantum number, the fifth randomized number matches the fifth representative quantum number, and the sixth randomized number matches the sixth representative quantum number, create an additional secure quantum encryption key based at least in part upon the fourth representative quantum number, the fifth representative quantum number, and the sixth representative quantum number; and perform an additional key storage operation using the additional secure quantum encryption key.

8. The system of claim 1, wherein:

the first quantum processor is further configured to:

generate, using the QRNG, an additional randomized number string comprising a fourth randomized number, a fifth randomized number, and a sixth randomized number;

encode, in accordance with the plurality of configuration parameters, the additional randomized number string into an additional plurality of quantum states comprising a fourth quantum state corresponding to the fourth randomized number, a fifth quantum state corresponding to the fifth randomized number, and a sixth quantum state corresponding to the sixth randomized number; and transmit, over the dedicated quantum channel, the additional plurality of quantum states to a fifth quantum processor; and the second quantum processor is further configured to:

measure each of the additional plurality of quantum states transmitted by the first quantum processor;

decode, based on the measurements of each of the additional plurality of quantum states, an additional plurality of representative quantum numbers comprising a fourth representative quantum number corresponding to the fourth quantum state, a fifth representative quantum number corresponding to the fifth quantum state, and a sixth representative quantum number corresponding to the sixth quantum state;

compare, using additional data exchanged in the classical channel, the additional plurality of representative quantum numbers to the additional randomized number string, wherein:

the fourth randomized number is compared to the fourth representative quantum number;

the fifth randomized number is compared to the fifth representative quantum number; and the sixth randomized number is compared to the sixth representative quantum number;

determine whether the fourth randomized number matches the fourth representative quantum number, the fifth randomized number matches the fifth representative quantum number, and the sixth randomized number matches the sixth representative quantum number;

in response to determining that the fourth randomized number does not match the fourth representative quantum number, the fifth randomized number does not match the fifth representative quantum number, and the sixth randomized number does not match the sixth representative quantum number, discard the fourth representative quantum number, the fifth representative quantum number, and the sixth representative quantum number;

tag the dedicated quantum channel as being compromised; and block future data exchanges between the first quantum processor and the second quantum processor using the dedicated quantum channel.

9. A method, comprising:

generating, using a Quantum Random Number Generator (QRNG) via a first quantum processor, a randomized number string comprising a first randomized number, a second randomized number, and a third randomized number;

encoding, in accordance with a plurality of configuration parameters, the randomized number string into a plurality of quantum states comprising a first quantum state corresponding to the first randomized number, a second quantum state corresponding to the second randomized number, and a third quantum state corresponding to the third randomized number;

transmitting, over a dedicated quantum channel, the plurality of quantum states to a second quantum processor, the dedicated quantum channel being configured to transport quantum information between the first quantum processor and the second quantum processor;

measuring, using the second quantum processor, each of the plurality of quantum states transmitted by the first quantum processor;

decoding, based on measurements of each of the plurality of quantum states, a plurality of representative quantum numbers comprising a first representative quantum number corresponding to the first quantum state, a second representative quantum number corresponding to the second quantum state, and a third representative quantum number corresponding to the third quantum state;

comparing, using data exchanged in a classical channel, the plurality of representative quantum numbers to the randomized number string, wherein:

the first randomized number is compared to the first representative quantum number;

the second randomized number is compared to the second representative quantum number; and the third randomized number is compared to the third representative quantum number;

determining, using the second quantum processor, whether the first randomized number matches the first representative quantum number, the second randomized number matches the second representative quantum number, and the third randomized number matches the third representative quantum number;

in response to determining that the first randomized number matches the first representative quantum number, the second randomized number does not match the second representative quantum number, and the third randomized number matches the third representative quantum number, discarding, using the second quantum processor, the second representative quantum number;

creating, using the second quantum processor, a secure quantum encryption key based at least in part upon the first representative quantum number and the third representative quantum number; and performing, using the second quantum processor, a key storage operation using the secure quantum encryption key.

10. The method of claim 9, further comprising:

in conjunction with performing the key storage operation, assigning, using the second quantum processor, encapsulation information to the secure quantum encryption key, the encapsulation information comprising encryption level, creation date, and at least one backup key; and providing, using the second quantum processor, an encapsulated version of the secure quantum encryption key to a classical processor.

11. The method of claim 9, further comprising:

receiving, using the second quantum processor, a request to secure a plurality of data objects via a communication interface;

determining, using the second quantum processor, whether there is a first encryption level associated with the plurality of data objects;

determining, using the second quantum processor, a second encryption level associated with the secure quantum encryption key, the second encryption level being proportional to a percentage of the plurality of quantum states used to create the secure quantum encryption key;

determining, using the second quantum processor, whether the first encryption level is equal to the second encryption level; and in response to determining that the first encryption level is equal to the second encryption level, encrypting, in accordance with an encryption protocol, the plurality of data objects using the secure quantum encryption key.

12. The method of claim 11, wherein:

the encryption protocol comprises a Zero-Knowledge Proofs protocol.

13. The method of claim 11, wherein:

the encryption protocol comprises a Trusted Execution Environment protocol.

14. The method of claim 11, wherein:

the encryption protocol comprises a Secure Multi-Party Computation protocol.

15. The method of claim 9, further comprising:

generating, using the QRNG in the first quantum processor, an additional randomized number string comprising a fourth randomized number, a fifth randomized number, and a sixth randomized number;

encoding, in accordance with the plurality of configuration parameters, the additional randomized number string into an additional plurality of quantum states comprising a fourth quantum state corresponding to the fourth randomized number, a fifth quantum state corresponding to the fifth randomized number, and a sixth quantum state corresponding to the sixth randomized number;

transmitting, over the dedicated quantum channel, the additional plurality of quantum states to a fifth quantum processor;

measuring, using the second quantum processor, each of the additional plurality of quantum states transmitted by the first quantum processor;

decoding, based on the measurements of each of the additional plurality of quantum states, an additional plurality of representative quantum numbers comprising a fourth representative quantum number corresponding to the fourth quantum state, a fifth representative quantum number corresponding to the fifth quantum state, and a sixth representative quantum number corresponding to the sixth quantum state;

comparing, using additional data exchanged in the classical channel, the additional plurality of representative quantum numbers to the additional randomized number string, wherein:

the fourth randomized number is compared to the fourth representative quantum number;

the fifth randomized number is compared to the fifth representative quantum number; and the sixth randomized number is compared to the sixth representative quantum number;

determining, using the second quantum processor, whether the fourth randomized number matches the fourth representative quantum number, the fifth randomized number matches the fifth representative quantum number, and the sixth randomized number matches the sixth representative quantum number;

in response to determining that the fourth randomized number matches the fourth representative quantum number, the fifth randomized number matches the fifth representative quantum number, and the sixth randomized number matches the sixth representative quantum number, creating, using the second quantum processor, an additional secure quantum encryption key based at least in part upon the fourth representative quantum number, the fifth representative quantum number, and the sixth representative quantum number; and performing, using the second quantum processor, an additional key storage operation using the additional secure quantum encryption key.

16. A non-transitory computer-readable medium storing instructions that when executed by a processor cause the processor to:

generate, using a Quantum Random Number Generator (QRNG) via a first quantum processor, a randomized number string comprising a first randomized number, a second randomized number, and a third randomized number;

encode, in accordance with a plurality of configuration parameters, the randomized number string into a plurality of quantum states comprising a first quantum state corresponding to the first randomized number, a second quantum state corresponding to the second randomized number, and a third quantum state corresponding to the third randomized number;

transmit, over a dedicated quantum channel, the plurality of quantum states to a second quantum processor, the dedicated quantum channel being configured to transport quantum information between the first quantum processor and the second quantum processor;

measure, using the second quantum processor, each of the plurality of quantum states transmitted by the first quantum processor;

decode, based on measurements of each of the plurality of quantum states, a plurality of representative quantum numbers comprising a first representative quantum number corresponding to the first quantum state, a second representative quantum number corresponding to the second quantum state, and a third representative quantum number corresponding to the third quantum state;

compare, using data exchanged in a classical channel, the plurality of representative quantum numbers to the randomized number string, wherein:

the first randomized number is compared to the first representative quantum number;

the second randomized number is compared to the second representative quantum number; and the third randomized number is compared to the third representative quantum number;

determine, using the second quantum processor, whether the first randomized number matches the first representative quantum number, the second randomized number matches the second representative quantum number, and the third randomized number matches the third representative quantum number;

in response to determining that the first randomized number matches the first representative quantum number, the second randomized number does not match the second representative quantum number, and the third randomized number matches the third representative quantum number, discard, using the second quantum processor, the second representative quantum number;

create, using the second quantum processor, a secure quantum encryption key based at least in part upon the first representative quantum number and the third representative quantum number; and perform, using the second quantum processor, a key storage operation using the secure quantum encryption key.

17. The non-transitory computer-readable medium of claim 16, wherein, when executed by the processor, the instructions further cause the processor to:

in conjunction with performing the key storage operation, assign, using the second quantum processor, encapsulation information to the secure quantum encryption key, the encapsulation information comprising encryption level, creation date, and at least one backup key; and provide, using the second quantum processor, an encapsulated version of the secure quantum encryption key to a classical processor.

18. The non-transitory computer-readable medium of claim 16, wherein, when executed by the processor, the instructions further cause the processor to:

receive, using the second quantum processor, a request to secure a plurality of data objects via a communication interface;

determine, using the second quantum processor, whether there is a first encryption level associated with the plurality of data objects;

determine, using the second quantum processor, a second encryption level associated with the secure quantum encryption key, the second encryption level being proportional to a percentage of the plurality of quantum states used to create the secure quantum encryption key;

determine, using the second quantum processor, whether the first encryption level is equal to the second encryption level; and in response to determining that the first encryption level is equal to the second encryption level, encrypt, in accordance with an encryption protocol, the plurality of data objects using the secure quantum encryption key.

19. The non-transitory computer-readable medium of claim 18, wherein:

the encryption protocol comprises a Zero-Knowledge Proofs protocol.

20. The non-transitory computer-readable medium of claim 18, wherein:

the encryption protocol comprises a Trusted Execution Environment protocol.

* * * * *